Patented May 8, 1934

1,957,478

UNITED STATES PATENT OFFICE 1,957,478

METHOD OF APPLYING LABELS

James Edward Snyder, Kenmore, N. Y., assignor to Du Pont Cellophane Company, Inc., New York, N. Y., a corporation of Delaware No Drawing. Application June 20, 1931, Serial No. 545,835

6 Claims. (Cl. 216—62)

This invention relates to the securing of gummed materials to various articles. More particularly, it relates to a method of affixing gummed labels and the like to waterproof and, preferably also, moistureproof materials.

In my copending application Ser. No. 473,755, filed August 7, 1930, which issued on July 21, 1931, as Patent No. 1,815,365, there is described a method of affixing gummed materials to articles to which water-soluble adhesives do not normally stick. That method contemplates the application to, at least, the gummed material or the article to which the gummed material is to be united, of a solution which renders the gum on the gummed material tacky and modifies the surface of the article so that upon superimposition the two will be united. In the preferred form of that method the uniting of the gummed material and article is effected under heat and pressure. The solution comprises a substance which is adapted to render the gum on the gummed material tacky and a substance which modifies the surface of the article so that upon superimposition the gummed material and article may be readily united.

I have found that, when the article to which the water-soluble adhesive does not attach itself consists of a coating formed on a base to which energized water-soluble adhesives normally stick, I can upon application of heat sufficiently rupture the coating to permit contact of the base with water-soluble adhesives, such as, for instance, those which are provided on gummed materials, whereby securing or affixing of the latter to the article may be readily and expeditiously effected.

It is therefore an object of this invention to provide a method which comprises energizing the water-soluble adhesive on a gummed material with water, rupturing with heat the coating on a base to which a water-soluble material normally sticks and fastening or securing the two materials together.

Other objects of this invention will become apparent from the following description and appended claims.

In accordance with the principles of this invention, an article comprising a base to which an energized water-soluble adhesive normally sticks and provided with a coating which normally does not stick to an energized water-soluble adhesive is treated in such a manner that the coating is ruptured and the adhesive contacts with said base, whereby the gummed material may be secured or affixed to the article.

In the preferred embodiment of this invention, the coating of the article is ruptured by means of heat and, if desired, in conjunction with pressure.

The base of the article, as explained above, should be of such composition that a water-soluble adhesive energized and rendered tacky by water satisfactorily adheres and sticks thereto. The base may be of such porosity that the applied heat will force a part of the coating into the pores thereof, whereby an insufficient amount of the coating will remain on the surface to prevent adhesion. As illustrative examples of preferred bases may be mentioned pellicular or membranous sheets of gelatin and regenerated cellulose, and illustrative examples of thinly coated, porous bases are various types of lacquered paper not, however, including impregnated paper such as waxed paper.

The coating on the base comprises a composition to which a water-soluble adhesive does not stick. It is apparent that the coating may be formed of numerous and different compositions depending to a great extent on the final use of the coated product. As specific illustrative examples of this large class of coated articles may be mentioned waterproof and moistureproof articles. For example, in a waterproof article the coating may comprise, for instance, a cellulose derivative, such as a cellulose ester or ether, either alone or in combination with suitable modifying ingredients. In a moistureproof article, the coating may consist of a composition which contains a waxy substance and preferably a minor portion thereof. The moistureproofing composition, in one modification, may comprise a cellulose derivative a gum or resin, a waxy substance with or without a plasticizer. In another form, the moistureproofing composition comprises a drying oil and a wax with or without a resin, while in a third form it comprises a synthetic resin and a wax with or without a plasticizer.

As illustrative examples of the gummed materials which may be affixed there may be mentioned labels, closures, instruction sheets, paper, tags attached to a string or ribbon, or the like.

In order to more clearly explain the present invention there is set forth an illustrative embodiment of one form of the process wherein a gummed label is affixed to a wrapper.

After an article has been wrapped in, for example, a moistureproof pellicular or membranous material, such as a sheet or film of regenerated cellulose moistureproofed with one of the moistureproofing compositions previously described, water alone is applied in any suitable manner to the gum on the label or to the portion of the wrapper where it is desired to affix the label, or both. The water energizes the gum on the label whereby it becomes tacky but is normally inert with respect to the coating of the moisture-proof material. The label is then superposed on the desired area of the wrapper and sufficient heat is applied in any convenient manner to rupture the coating, whereby the energized adhesive may contact with the sheet or film of regenerated cellulose. Upon the application of pressure the label is affixed. It is, of course, apparent that the coating may be ruptured prior to the superimposition of the gummed material.

In the preferred form, the adhesive on the label is energized with water and then superposed on the wrapper, after which the materials are united with heat and pressure.

The procedure above outlined is particularly suitable for applying a gummed label to the ends of a package wherein the wrapper of the type herein described is formed with end folds. In such a case, either the ends of the package or the adhesive on the gummed label, or both, are treated with water and the label superposed on the ends of the package. Heat is then applied, preferably in the presence of pressure, whereby the label is affixed to the package. The pressure serves to satisfactorily and compactly iron down the folds, and the heat in many instances heat seals them.

Precise temperature and pressure conditions are not essential for the successful carrying out of the method. The temperature need be of such a degree that it ruptures the coating, dissipates the water and/or renders the surfaces of the fold so that they are capable of being heat sealed. The pressure need be only of such magnitude as will bring the label, wrapper and/or surfaces of the fold in intimate contact with each other.

From the preceding it is apparent that the method constituting this invention is simple and economical. It utilizes water, which is comparatively inexpensive, and does not require any expensive or elaborate apparatus. It is readily adaptable to the present day labeling machines without the necessity of reconstructing or redesigning thereof. No precautions are necessary to maintain the water of uniform composition as is necessary when volatile solvents are used. It is odorless, non-toxic and can be very easily removed from the parts of the machine on or with which it may fall or contact without any great effort.

It is apparent that the principles of the instant invention are not restricted and limited to the precise material hereinbefore specifically described. For instance, an ungummed label may be affixed to articles of the class hereinbefore mentioned by applying an energized water-soluble adhesive to at least the gummed material or the article to which the gummed material is to be united and then securing them together by heat and pressure as previously described. Similarly moistureproof articles of the type described may be sealed or united to similar or non-similar articles by applying an energized water-soluble adhesive to at least one of the surfaces which is to constitute the joint and then applying heat and pressure as previously explained.

Since it is obvious that various changes may be made in the specific details herein set forth without departing from the spirit of the invention, this invention is not restricted thereto except as set forth in the appended claims.

I claim:

1. A method which comprises energizing the adhesive of a gummed material with water, disposing the tacky surface of said material on an article having a coating which is insensible to the energized adhesive and a base which sticks to said energized adhesive, applying heat and pressure to rupture said coating whereby the base contacts with the energized adhesive and the article and gummed material are united.

2. A method which comprises energizing the adhesive of a gummed material with water, disposing the tacky surface of said material on a pellicle of regenerated cellulose having a coating which is insensible to the energized adhesive, applying heat and pressure whereby the coating is ruptured and the regenerated cellulose contacts with the energized adhesive and the gummed material and the regenerated cellulose article are united.

3. A method which comprises energizing the adhesive of a gummed material with water, disposing the tacky surface of said material on a pellicle of regenerated cellulose having a moistureproof coating which is insensible to the energized adhesive, applying heat and pressure whereby the moistureproof coating is ruptured and the regenerated cellulose contacts with the energized adhesive and the gummed material and the regenerated cellulose article are united.

4. A method which comprises energizing the adhesive of a gummed material with water, disposing the tacky surface of said material on a pellicle of gelatin having a coating which is insensible to the energized adhesive, applying heat and pressure whereby the coating is ruptured and the gelatin contacts with the energized adhesive and the gummed material and the gelatin article are united.

5. A method which comprises energizing the adhesive of a gummed material with water, disposing the tacky surface of said material on a pellicle of gelatin having a moistureproof coating which is insensible to the energized adhesive, applying heat and pressure whereby the moistureproof coating is ruptured and the gelatin contacts with the energized adhesive and the gummed material and the gelatin article are united.

6. A method of affixing a label to an article having a base which sticks to energized water-sensitive adhesives and a coating which does not stick to such adhesives, which comprises applying an adhesive energized with water to at least the label or the article, superposing the label and article and applying heat and pressure, whereby the coating is ruptured and the label is affixed to the article.

JAMES EDWARD SNYDER.